Inventor
Ralph C. Bateman
By Oldham & Oldham
Attys

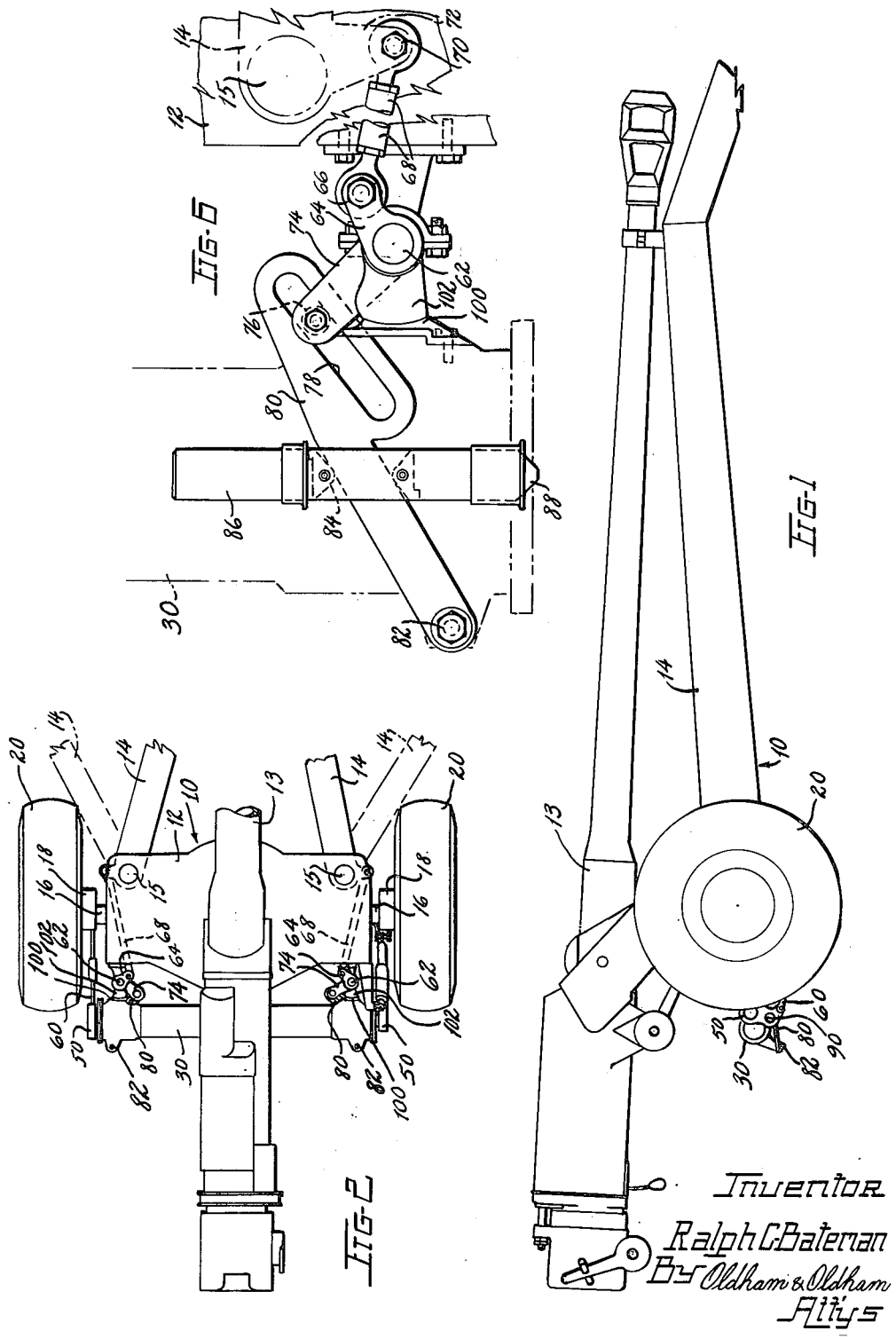

Patented June 17, 1952

2,600,462

UNITED STATES PATENT OFFICE 2,600,462

TORSIONAL EQUALIZER SUSPENSION DEVICE

Ralph C. Bateman, Akron, Ohio

Application February 24, 1947, Serial No. 730,609

9 Claims. (Cl. 280—6)

This invention relates to vehicle supports, and, more particularly, is concerned with resilient supports for vehicle wheels, and with individual wheel springing achieved by stressing metal bars in torsion.

It has been proposed heretofore to utilize the torsion spring of metal bars to support vehicle wheels, but known structures are open to the objection that they are relatively complicated and expensive, are subject to displacement or breakage, are heavy or cumbersome, are not adapted to tandem wheel alignment, are not capable of being locked against springing movement, are not utilized for automatically compensating for centrifugal throw or for automatic body leveling, and, in general, are not readily adapted to known vehicle construction.

It is the general object of my invention to avoid and overcome the foregoing and other difficulties of and objections to known practices by the provision of a relatively inexpensive, readily constructed and maintained, torsion and torsion bar support for vehicles, and particularly adapted to truck, gun carriages, railroad trucks, and other heavy vehicles.

Another important object of my invention is to provide mechanisms of the type described and characterized by means for mechanically or automatically keeping a vehicle body level or for compensating for centrifugal force upon a vehicle during a turn.

Another object of my invention is the provision on a vehicle of individual wheel suspension wherein the wheels are resiliently supported by means of bodies or bars subjected to torsion stress.

Another object of my invention is to provide a vehicle with individual resilient wheel supports which take a minimum of space, reduce the upsprung weight, permit the mounting of the wheels in tandem, and which will operate over long periods with little or no maintenance.

Another object of my invention is to provide vehicles and vehicle wheel supports as heretofore described, and characterized by means for locking the wheels against movement which is often advisable in truck or gun carriages.

Another object of my invention is to provide a torsion bar type of vehicle wheel suspension in which a pair of torsion bars for separate wheels are positioned together in a housing which is pivotally mounted on a vehicle frame, with the housing being left free to pivot or being adapted to be locked to the frame when desired.

The foregoing objects of my invention, and other objects which will become apparent as the description proceeds, are achieved by the provision of a vehicle support including a frame, bell cranks pivotally mounted on each side of the frame and having one arm portion extending substantially horizontal of the vehicle and the other arm portion extending substantially at right angles to the first arm portion, a wheel rotatably mounted at the end of the first named arm portion, a torsion bar mounted on the frame of the vehicle adjacent each wheel, means fixedly holding one end of each torsion bar, means rotatably journaling the other end of each bar, an arm on the free end of each bar, and a link connecting the end of the arm to the second named arm portion of the adjacent bell crank.

In certain embodiments of the invention the torsion bars are utilized to mount the wheels in tandem relation on each side of the vehicle. Also, means may be included in the apparatus for locking the bell crank supports for the wheels against movement, and the torsion bars may be contained in a housing which is pivotally or optionally rigidly mounted on the vehicle frame.

An important feature of the invention is to provide mechanism for manually or automatically changing the level of the vehicle to compensate for slanting terrain or centrifugal force.

For a better understanding of my invention reference should be had to the accompanying drawings, wherein:

Fig. 1 is a side elevation of a gun carriage incorporating the principles of the invention, and shown in towing position;

Fig. 2 is a plan view, partly broken way, illustrating the gun carriage of Fig. 1;

Fig. 6 is an enlarged plan view, partly broken away, of the mechanism for locking the wheels against springing movement and for locking and releasing the torsion bar housing against pivotal movement.

The principles of my invention may be employed to spring wheels on vehicles of a wide variety of types. However, one first application of the invention has been to resiliently support the wheels of a gun carriage, and, accordingly, the invention has been so illustrated and will be so described.

Figure 3:
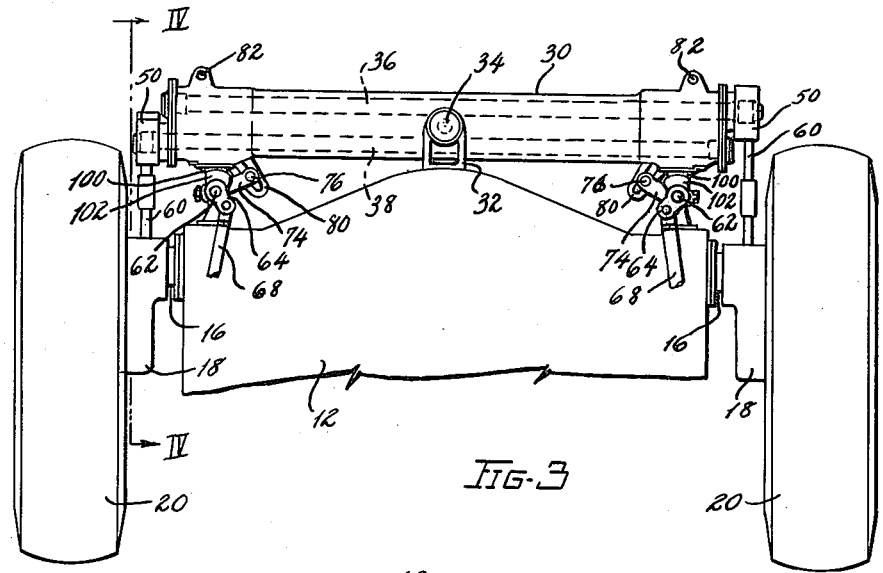
Fig. 3 is a plan view, on a somewhat larger scale, of the gun carriage of Figs. 1 and 2, but with the gun removed to better illustrate details of the torsion bar springing.

Having reference to Figs. 1, 2 and 3 of the drawings, the numeral 10 indicates generally a gun carriage having a main frame 12 which rotatably supports a gun barrel 13 for vertically adjustable and angularly adjustable movement, all in accord with mechanisms which form no part of this invention. Pivotally secured to the frame 12 at 15 are a pair of trails 14, whose purpose and function are well known, the trails being adapted to be moved from a position close together, in which position the gun is adapted to be towed by a truck, or the like, to a position with the trails spread, in which position the gun is adapted to be fired. In Fig. 1 of the drawings, the trails are illustrated together, with the gun barrel 13 being swung to position the muzzle of the gun barrel adjacent the end of the trails, the trails being shown elevated in Fig. 1 for attachment to a tow truck. It will be understood that when the gun is moved to the position in which it is to be used, the gun will be detached from the tow truck, the trails 14 will be spread and the gun barrel will be swung around 180° to bring it substantially into firing position.

During the towing operation, the trails 14 are positioned in the full lines illustrated in Fig. 2, and when the gun is placed in firing position, the trails are moved to substantially the dotted lines shown in Fig. 2.

Turning now to Fig. 3 of the drawings, the frame 12 carries oppositely directed stub shafts 16 which pivotally support bell cranks 18 having one arm extending forwardly of and substantially horizontally to the frame 12. A wheel 20 is rotatably mounted upon an outwardly directed stud axle 22, at the forward end of the horizontal arm portion of each bell crank 18. Each bell crank 18 includes a second arm portion 24 in the form of a downwardly extending lug directed at substantially right angles to the horizontal portion of the bell crank. The lug 24 of each bell crank 18 is adapted to be secured to torsion bar springing apparatus which will now be described.

Figure 4:
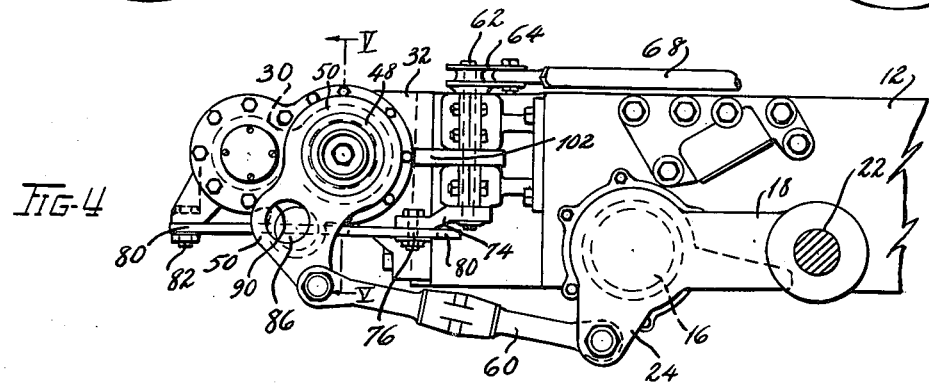
Fig. 4 is an enlarged side elevation, partly broken away, and taken substantially on line IV—IV of Fig. 3, and illustrating the details of the connecting mechanism between the torsion bar and the vehicle wheel.
Figure 5:
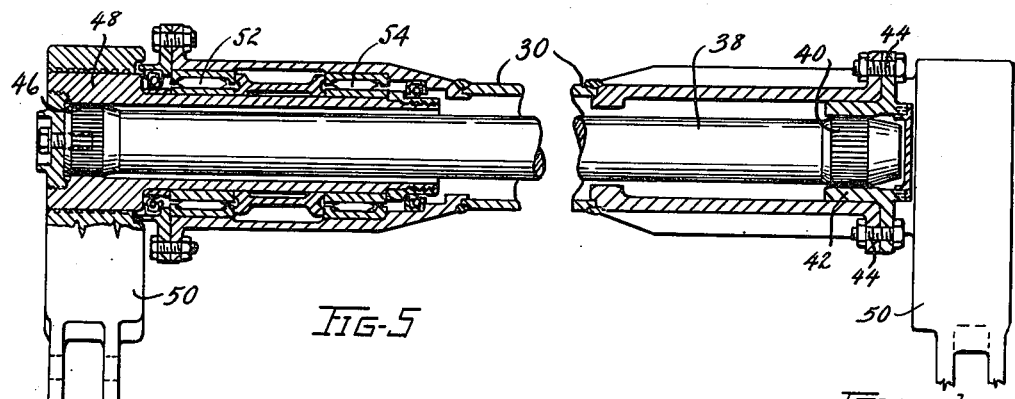
Fig. 5 is a vertical, cross-sectional view, on a still larger scale, and taken substantially on line V—V of Fig. 4.

The torsion bar apparatus is best evident from Figs. 3 to 5 of the drawings, and includes a housing 30 which is pivotally secured to the frame 12 by a forked bracket 32 mounted on the back of the frame and having the lower and upper arms of the fork positioned below and above the torsion bar housing 30. A pin 34 held by the forks of the bracket 32 extends through a suitable aperture in the torsion bar housing. A pair of metal torsion bars 36 and 38 are mounted side by side in the housing 30, and opposite ends of each bar are secured in fixed relation to the housing. This is achieved in the manner best illustrated in Fig. 5 wherein the right hand end of the bar is illustrated as having a plurality of splines or teeth 40 cut thereon which are received in complementary teeth or splines formed in a lock ring 42 secured by bolts 44 to the end of the housing 30. The other end of the bar 38 is also formed with teeth or splines 46 which engage with complementary teeth or splines formed on the inside of a hollow shaft 48, the outer end of the shaft 48 being formed integral with or having secured thereto a crank 50, and the inner end of the shaft, of somewhat reduced diameter, being journaled for oscillating movement in roller bearings 52 and 54 held in the end of the housing 30. Inasmuch as the shaft 36 is mounted in a similar manner, but of opposite hand, the mechanism associated with shaft 36 will not be described.

The crank 50 at each end of the torsion bar mechanism is adapted to be secured to the associated lug 24 of the bell crank 18 at that side of the vehicle, and this is achieved by the provision of a link 60 which will have semi ball and socket connections at its ends with the lug 24 and the end of the crank 50.

An important feature of the invention is that when the gun is in firing position the resilient wheel supports are locked against springing movement. This is achieved in the manners illustrated in Figs. 2, 4 and 6 of the drawings. To this end, the frame 12 is provided with an upstanding pin 62 adjacent each side, and the pin 62 rotatably carries a bell crank 64 having an arm portion 66 which is pivotally secured to a link 68 in turn pivotally fastened as at 70 to a lug 72 formed integral with the end of each trail 14. Each trail 14 is pivotally mounted upon the frame 12 at points 15, as heretofore described. Bell crank 64 also has an arm portion 74 rotatably supporting a roller 76 at its end which is slidably received in a slot 78 formed at the end of a link plate 80. The other end of the link plate 80 is pivotally mounted at 82 upon a lug formed on the end of the torsion bar housing 30. The link plate 80 extends slidably through an opening 84 in a lock pin 86, the pin being slidably mounted at the bottom of the end of the torsion box 30. The end of the lock pin 86 is beveled, as at 88, to facilitate entry of the pin into a hole 90 formed in the arm 50 secured to the end of the torsion bar.

In this manner, when the trails 14 are moved from the full line towing position shown in Fig. 2 to the dotted line or operating position, the lugs 72 move the links 68 to throw the bell cranks 66—74 to move the link plates 80 around the pivots 82 to thereby move the lock pins 86 into the holes 90 to lock the arms 50 against movement. This locks the wheel suspension against movement so that when the gun is fired the resilient wheel suspensions are inoperative. The same structure is often advantageous in a truck, trailer, crane with overhanging boom, or other commercial vehicles to lock the wheel suspensions against movement during loading, unloading, or other operations. It will be understood that in commercial constructions the link 68 on each side of the vehicle frame may extend to a common operating means, such as a pressure cylinder, rather than being operated by trails 14.

An important feature of the invention is the provision of leveling mechanism in association with the wheel suspensions. In the form of the invention illustrated, this is achieved by providing a cam plate 100 on the back of each end of the torsion box housing 30, and each cam plate 100 is engaged by a locking and unlocking cam 102 mounted rigidly on the bell crank 64.

In the operation of the locking apparatus just described when the vehicle is moving and the resilient wheel suspensions are functioning as heretofore described, the cam 102 on each side of the vehicle frame is in engagement with its associated cam plate 100 to rigidly lock the torsion bar housing 30 in association with the vehicle frame 12, but when the vehicle is stopped, and the locking pins 86 are moved by the mechanism of Fig. 6 into locking position to hold the wheels against resilient movement, each cam 102 is simultaneously moved out of locking engagement with its associated cam plate 100, and this releases the torsion box housing 30 for pivotal movement about the pin 34. The torsion box housing thus acts as an equalizing bar being free to pivot in a horizontal plane. When one wheel tends to ride high, the torsion box housing is moved to the rear on that side and to move forward on the opposite side, lowering the opposite wheel. The result is that the vehicle frame tends to establish itself in a horizontal level even though one wheel is held higher than the other. It is possible to utilize the frame leveling mechanism just described when the vehicle is traveling, as well as when it is standing still, and I will describe hereinafter vehicle structures employing the equalizing mechanism to counteract against centrifugal force and assist vehicles over inclined terrain. Also, it should be understood that the invention is not limited to the equalizer bar action only when the wheels are locked against springing movement.

An important part of any actual assembly as above or hereinafter described will be shock absorbing devices to absorb energy in either or both directions of oscillating springing movement of the wheels, but such shock absorbers have not been illustrated in order to permit clearer illustration of the features of the invention.

From the foregoing, it will be recognized that the various objects of my invention have been achieved by the provision of a relatively simple, efficient, inexpensive, easily constructed and maintained apparatus adapted to be used in conjunction with vehicles of various types. The wheels are independently and resiliently sprung. The wheels may be locked against springing movement for loading, unloading, or other operations. The apparatus of the invention may be employed to automatically or manually level the frame of the vehicle or to compensate for centrifugal force on the vehicle when at rest or when traveling. Of course, the torsion bar lengths and diameters, the lengths of the wheel support arms and the points of pivotal support all can be made or positioned to provide the desired type of springing action for any given vehicle.

While in accord with the patent statutes, I have specifically illustrated and described at least one best known embodiment of my invention, it is to be particularly understood the invention is not limited thereto or thereby, but that the scope of the invention is defined in the appended claims.

What I claim is:

1. A vehicle support including a frame, stub shafts extending oppositely from the frame, a bell crank pivotally mounted on each shaft and having one arm portion extending substantially horizontally of the vehicle and the other arm portion extending substantially at right angles to the first arm portion, a wheel rotatably mounted at the end of the first-named arm portion, a torsion bar mounted on the frame of the vehicle adjacent each wheel, means fixedly holding one end of each torsion bar, means rotatably journaling the other end of each bar, an arm on the free end of each bar, a link connecting the end of the arm to the second-named arm portion of the adjacent bell crank, a housing surrounding the torsion bars, means pivotally mounting the housing on the vehicle frame, cam means for releasably locking the housing to the frame, means for releasably locking the arms on the torsion bars against movement, and means for simultaneously locking the arm locking means and unlocking the cam means.

2. A vehicle support including a frame, means supporting a pair of wheels, metal bars mounted in association with the frame and connected to the last-named means so that oscillating movement thereof strains the bars in torsion, a housing surrounding the torsion bars, means pivotally mounting the housing on the vehicle frame, cam means for releasably locking the housing to the frame, means for releasably locking the arms on the torsion bars against movement, and means for simultaneously locking the arm locking means and unlocking the cam means.

3. A vehicle support including a frame, torsion bars, support wheels, means connecting one portion of each of said torsion bars to one of said wheels, means connecting a second portion of each of said torsion bars to said frame, a housing surrounding the torsion bars, means pivotally mounting the housing on the vehicle frame, and releasable means for locking the housing in a given position on the frame and including a cam and a cam plate positioned in releasable engagement between said housing and said frame to lock same in fixed relation when desired.

4. A vehicle support including a frame, torsion bars, a housing surrounding the torsion bars, means pivotally mounting the housing on the vehicle frame, means for releasably locking the housing to the frame, and means for releasably locking the torsion bars against movement, said second named means including movable means on said frame, a locking pin, means connecting said movable means to said pin for controlling the position thereof, and an apertured plate connected to a torsion bar for receiving said locking pin.

5. A vehicle support including a frame, stub shafts extending oppositely from the frame, a bell crank pivotally mounted on each shaft and having one arm portion extending substantially horizontally of the vehicle and the other arm portion extending substantially at right angles to the first arm portion, a wheel rotatably mounted at the end of the first-named arm portion, a torsion bar mounted on the frame of the vehicle adjacent each wheel, means fixedly holding one end of each torsion bar, means rotatably journaling the other end of each bar, an arm on the free end of each bar, a link connecting the end of the arm to the second-named arm portion of the adjacent bell crank, a housing surrounding the torsion bars, means pivotally mounting the housing on the vehicle frame, means for releasably locking the housing to the frame, and means for releasably locking the arms on the torsion bars against movement.

6. The combination in a vehicle of independently supported wheels, a torsion bar associated with each wheel and adapted to be stressed in torsion upon springing movement of the wheel, a housing surrounding the torsion bars, means pivotally mounting the housing with respect to the vehicle, means for releasably locking the housing against pivotal movement with respect to the vehicle, and means releasably locking the wheels against springing movement and for simultaneously unlocking the housing to provide for pivotal movement of the housing.

7. The combination in a vehicle of independently supported wheels, a torsion bar associated with each wheel and adapted to be stressed in torsion upon springing movement of the wheel, a housing surrounding the torsion bars and extending transversely of the vehicle, means pivotally mounting the housing intermediate its ends with respect to the vehicle, means for releasably locking the housing against pivotal movement with respect to the vehicle, and means releasably locking the wheels against springing movement and being interconnected with said second named means.

8. The combination in a vehicle of independently supported wheels, which vehicle has a frame, a torsion bar associated with each wheel and adapted to be stressed in torsion upon springing movement of the wheel, a housing surrounding the torsion bars, means pivotally mounting the housing with respect to the vehicle, and means for releasably locking the housing with respect to the vehicle and including a movable lock member connected between the housing and the vehicle frame.

9. The combination in a vehicle of independently supported wheels, a torsion bar associated with each wheel and adapted to be stressed in torsion upon springing movement of the wheel, a housing surrounding the torsion bars, means pivotally mounting the housing with respect to the vehicle, and means releasably locking the wheels against springing movement said last two means being co-ordinated whereby only one means can be operated at any instant.

RALPH C. BATEMAN.

REFERENCES CITED

The following references are of record in the file of this patent:

UNITED STATES PATENTS

| Number | Name | Date |
| --- | --- | --- |
| 1,581,358 | Mayer | Apr. 20, 1926 |
| 2,033,493 | Straussler | Mar. 10, 1936 |
| 2,166,456 | Montrose-Oster | July 18, 1939 |
| 2,168,630 | Schiff | Aug. 8, 1939 |
| 2,226,047 | Borgward | Dec. 24, 1940 |
| 2,254,261 | Best | Sept. 2, 1941 |
| 2,256,069 | Wagner | Sept. 16, 1941 |